(12) United States Patent
Sugiyama

(10) Patent No.: US 7,359,925 B2
(45) Date of Patent: Apr. 15, 2008

(54) DATABASE SYSTEM, ITS CONTROL METHOD, AND INFORMATION PROCESSING APPARATUS

(75) Inventor: Mitsumasa Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 09/161,401

(22) Filed: Sep. 28, 1998

(65) Prior Publication Data

US 2002/0083084 A1   Jun. 27, 2002

(30) Foreign Application Priority Data

Sep. 30, 1997 (JP) ............................... 9-267277

(51) Int. Cl.
*G06F 12/00* (2006.01)
*G06F 11/00* (2006.01)

(52) U.S. Cl. .................. 707/204; 707/201; 707/202; 707/203; 714/6; 711/162; 711/163

(58) Field of Classification Search ........ 707/201–204, 707/500–511, 1, 200; 715/500.1, 501, 502, 715/503–511, 500; 711/162, 163, 114, 100; 714/6, 100

See application file for complete search history.

(56) References Cited

U.S. PATENT DOCUMENTS

| | | | | |
|---|---|---|---|---|
| 5,047,918 A * | 9/1991 | Schwartz et al. | ............ | 364/200 |
| 5,210,868 A * | 5/1993 | Shimada et al. | ............ | 707/104 |
| 5,608,874 A * | 3/1997 | Ogawa et al. | ............... | 709/246 |
| 5,649,152 A * | 7/1997 | Ohran et al. | ................. | 711/114 |
| 5,649,196 A * | 7/1997 | Woodhill et al. | ............ | 707/204 |
| 5,684,984 A * | 11/1997 | Jones et al. | .................. | 345/788 |
| 5,796,397 A | 8/1998 | Kusano | ..................... | 715/804 |
| 5,842,222 A * | 11/1998 | Lin et al. | ..................... | 707/202 |
| 5,966,730 A * | 10/1999 | Zulch | ......................... | 707/202 |
| 5,970,502 A * | 10/1999 | Salkewicz et al. | .......... | 707/201 |
| 6,014,674 A * | 1/2000 | McCargar | .................... | 707/202 |
| 6,330,568 B1 * | 12/2001 | Boothby et al. | ............ | 707/201 |

FOREIGN PATENT DOCUMENTS

| | | |
|---|---|---|
| JP | 4-321162 | 11/1992 |
| JP | 4-352274 | 12/1992 |
| JP | 8-137804 | 5/1996 |
| JP | 8-305615 | 11/1996 |

\* cited by examiner

*Primary Examiner*—Ella Colbert
(74) *Attorney, Agent, or Firm*—Fitzpatrick, Cella, Harper & Scinto

(57) ABSTRACT

A database client which can access a plurality of databases copies data selected from a source database to a destination database. The database client compares attribute items of attribute information appended to the data to be copied with those which can be set in the destination database, and directly copies an attribute item which can be set in the destination database to the corresponding attribute item. On the other hand, the database client copies attribute information of an attribute item which cannot be set in the destination database to a predetermined attribute item in the destination database. In this way, upon copying data between databases with different kinds of attribute information that can be set, the destination database can hold the attribute information of the source data.

11 Claims, 9 Drawing Sheets

FIG. 4

| DOCUMENT ATTRIBUTE NAME | DATA |
|---|---|
| PATENT NAME | DOCUMENT DATABASE |
| PUBLICATION NUMBER | 1234567 |
| PUBLICATION DATE | JAN 1, 1997 |
| APPLICANT | |
| COMMENT | REVIEW REQUIRED |
| IMPORTANCE | |

FIG. 5

| DOCUMENT ATTRIBUTE NAME | DATA |
|---|---|
| DOCUMENT NAME | |
| DOCUMENT NUMBER | |
| CREATOR | |
| COMMENT | REVIEW REQUIRED<br>[PATENT NAME] : DOCUMENT DATABASE<br>[PUBLICATION NUMBER] : 1234567<br>[PUBLICATION DATE] : JAN 1, 1997 |

FIG. 7

[ DATABASE ]
 FROM = PATENT PUBLICATION DATABASE
 TO = REPORT DATABASE
[ PROPERTY ]
 DOCUMENT NAME = PATENT NAME
 DOCUMENT NUMBER = PUBLICATION NUMBER
 CREATOR = APPLICANT
 COMMENT = IMPORTANCE
 COMMENT = COMMENT

FIG. 9

| DOCUMENT ATTRIBUTE NAME | DATA |
|---|---|
| DOCUMENT NAME | DOCUMENT DATABASE |
| DOCUMENT NUMBER | 1234567 |
| CREATOR | |
| COMMENT | REVIEW REQUIRED<br>[ PUBLICATION DATE ] : JAN 1, 1997 |

DATABASE SYSTEM, ITS CONTROL METHOD, AND INFORMATION PROCESSING APPARATUS

BACKGROUND OF THE INVENTION

The present invention relates to a database and, more particularly, to a database system which appends attribute information to registered data, and performs registration, search, display, editing, printing, and the like based on the appended attribute information, its control method, and an information processing apparatus.

In general, a document database system which registers, searches, displays, edits, and prints document data by setting document attributes such as document names, keywords, and the like to document data is known. Also, a so-called distributed document database system including a plurality of kinds of document databases has been proposed.

In such distributed database system, if different document attributes can be set in units of document databases, attribute information can be conveniently set in correspondence with the types of documents.

However, in the distributed document database system which has attribute information inherent to databases, when a document is copied between document databases having different document attributes, document attribute data which is not present in the copy destination is deleted. For this reason, when document data may be copied between different document databases, all the document databases must have the same document attribute.

When all the document databases must have the same document attribute, document attributes unique to individual document databases cannot be set. For example, assuming an office including both a document database that registers patent publications and a document database that registers reports, it is convenient if the document database that registers patent publications can be searched by setting a publication number for a document as a document attribute. On the other hand, in the document database that registers reports, it is convenient if the database document can be searched by setting a document number for a document as a document attribute. However, when all the document databases must have the same document attribute, different document attributes cannot be set in units of document databases. For this reason, a document attribute which is not required in some document databases must be set for all the document databases, or only a common document attribute must be used. For example, document attributes "publication number" and "document number" need both be settable for the document databases for patent publications and reports.

When document attribute data which is not present in the copy destination is deleted, if a document is copied between document databases having different document attributes, data is automatically deleted. For example, assume that a document in a document database which sets "publication number" as a document attribute is copied to a document database which has no document attribute "publication number" but sets "document number". In this case, even when the publication number of a source document is used in correspondence with the document number in the copy destination, the publication number data is deleted upon copying. For this reason, the operator must input a new document number by checking the document attribute of the source document. For this reason, operations become complicated, and another operator error may occur.

When the operator does not notice that a document attribute is deleted, he or she may experience a problem later. Especially, when a document is copied from a given document database and the source document is deleted, the document attribute of the source document cannot be checked, thus posing a serious problem.

Furthermore, when a document which sets a publication number is copied to a document database which cannot set publication numbers, and is copied again to the document database which can set publication numbers, the publication number set previously has already been deleted, and cannot be recovered. Hence, the operator must re-input the publication number, and still another operator error may occur.

In some cases, another document database is prepared, and is used as a backup for a plurality of other document databases. In such case, the backup database must have document attributes of all the document databases to be backed up. For this reason, when a document attribute that can be set in a document database is changed, that of the backup document database must also be changed, resulting in a heavy load on the operator.

SUMMARY OF THE INVENTION

The present invention has been made in consideration of the aforementioned problems, and has as its object to provide a database apparatus, system, and method, which allow a destination database to hold attribute information of source data upon copying data between databases that are appended different kinds of attribute information.

It is another object of the present invention to easily detect attribute information set in a source database of a document by checking a document attribute appended to a document in a destination database.

It is still another object of the present invention to easily and automatically recover source attribute information when given data is copied to a database having a different kind of attribute information, and is copied again to the source database.

It is still another object of the present invention to easily build a common, backup database for a plurality of databases with different kinds of attribute information by preventing loss of attribute information upon copying data between databases.

It is still another object of the present invention to prevent operator errors by converting and copying attribute information in accordance with conversion information used for converting the attribute information, and by appropriately copying the attribute information without any intervention of the operator.

It is still another object of the present invention to create and register conversion information by simple operation by starting creation of the conversion information when the corresponding conversion information is not registered in source and destination databases.

In order to achieve the above objects, according to one aspect of the present invention, there is provided an information processing apparatus which can access a plurality of databases, comprising first copying means for copying data selected from a first database to a second database, determination means for determining if each of attribute items of attribute information appended to the data can be set in the second database, and second copying means for copying information of an attribute item, which is determined by the determination means not to be settable in the second database, to a predetermined attribute item of the second database.

In order to achieve the above objects, according to another aspect of the present invention, there is provided an information processing apparatus for backing up data present in a plurality of databases, comprising first copying means for copying data present in one of the plurality of databases to a backup database, determination means for determining if each of attribute items of attribute information appended to the data can be set in the backup database, second copying means for copying information of an attribute item, which is determined by the determination means to be settable in the backup database, to a corresponding attribute item of the backup database, and copying information of an attribute item, which is determined by the determination means not to be settable in the backup database, to a predetermined item of the backup database in a predetermined format, and information recovery means for, when attribute information stored in the predetermined attribute item in the predetermined format is detected upon copying data from the backup database to one of the plurality of databases, recovering the attribute information on the basis of an attribute item name and contents thereof indicated by the information.

In order to achieve the above objects, according to still another aspect of the present invention, there is provided an information processing apparatus which can access a plurality of databases, comprising first copying means for copying data selected from a first database to a second database, holding means for holding conversion information indicating a correspondence between attribute items of the first and second databases, conversion means for converting each of attribute items of attribute information appended to data copied by the first copying means to an attribute item of the second database in accordance with the conversion information, and second copying means for copying the attribute information converted by the conversion means as attribute information in the second database.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of a document attribute;

FIG. 5 is a table showing an example of a document attribute upon copying a document shown in FIG. 4 to another document database named "report database";

FIG. 7 is a view showing an example of document attribute conversion information in the fourth embodiment of the present invention;

FIG. 9 is a table showing document attribute information upon copying the document shown in FIG. 4 to a report database in accordance with the document attribute conversion information shown in FIG. 8.

DETAILED DESCRIPTION OF THE PREFERRED EMBODIMENTS

Preferred embodiments of the present invention will now be described in detail in accordance with the accompanying drawings.

First Embodiment

Figure 1:
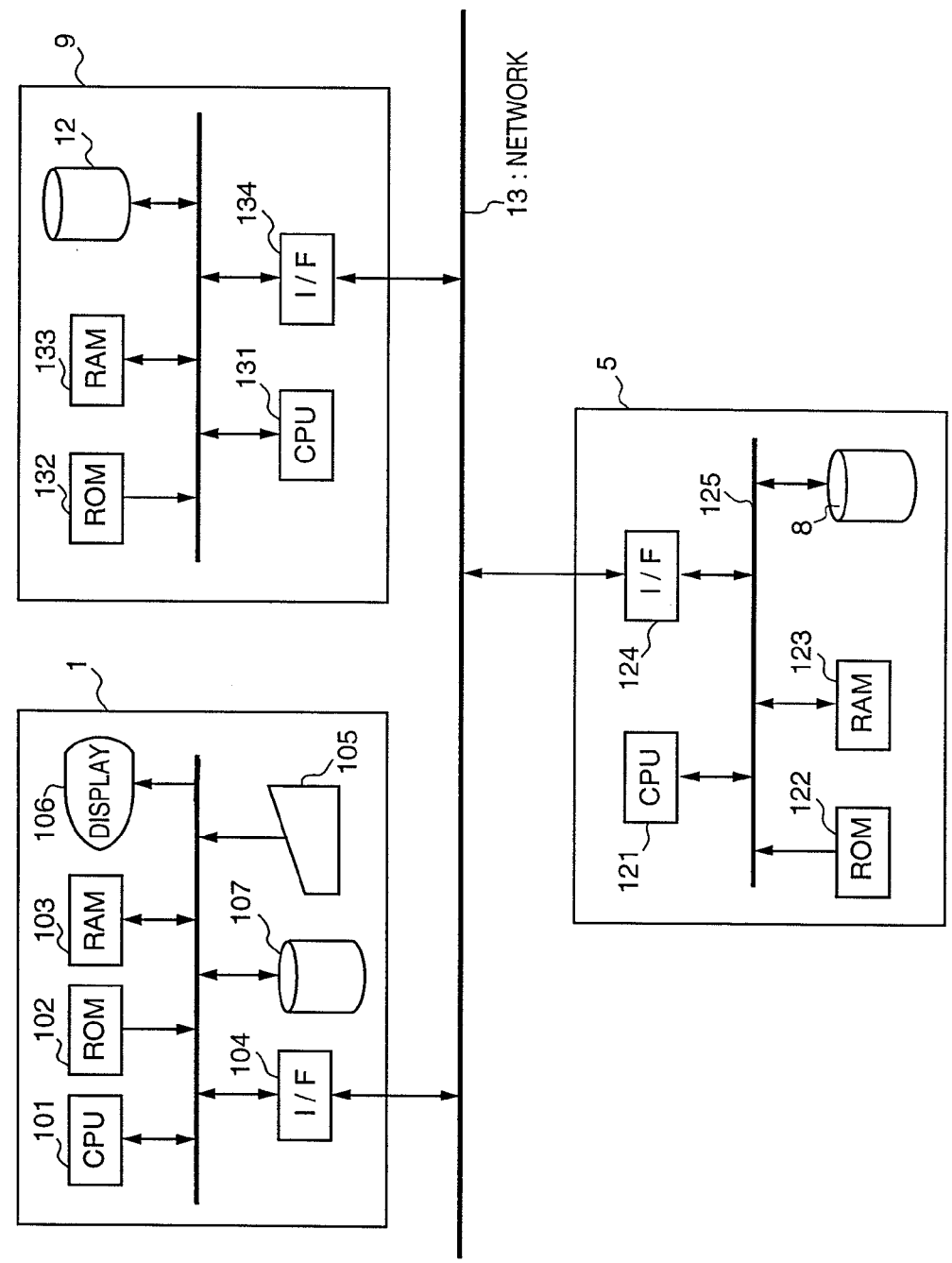
FIG. 1 is a block diagram showing the arrangement of a distributed document database system according to the first embodiment of the present invention.

FIG. 1 is a block diagram showing the arrangement of a distributed document database system according to the first embodiment. Referring to FIG. 1, reference numeral 1 denotes a client personal computer (to be referred to as a database client hereinafter). In the database client 1, reference numeral 101 denotes a CPU which executes various kinds of control. Reference numeral 102 denotes a ROM which stores various control programs executed by the CPU 101. Reference numeral 103 denotes a RAM which provides a work area for the CPU 101. Reference numeral 104 denotes a network interface which allows communications with an external apparatus via a network 13.

Reference numeral 105 denotes an input device which comprises a keyboard and mouse. Reference numeral 106 denotes a display which makes various kinds of display under the control of the CPU 101. Reference numeral 107 denotes an external storage device which reads out and stores data using a floppy disk, hard disk, CD-ROM, or the like. In the above arrangement, a control program executed by the CPU 101 may be loaded from the external storage device 107 onto the RAM 103, and may be executed by the CPU 101. Reference numeral 108 denotes a system bus.

Reference numerals 5 and 9 denote database server computers (to be referred to as database servers hereinafter). The database servers 5 and 9 respectively comprise CPUs 121 and 131, ROMs 122 and 132, RAMs 123 and 133, network interfaces 124 and 134, storage devices 8 and 12, and system buses 125 and 135. Of course, the database servers 5 and 9 may have input devices and displays. Reference numeral 13 denotes a network for interconnecting the database client 1 and database servers 5 and 9.

Figure 2:
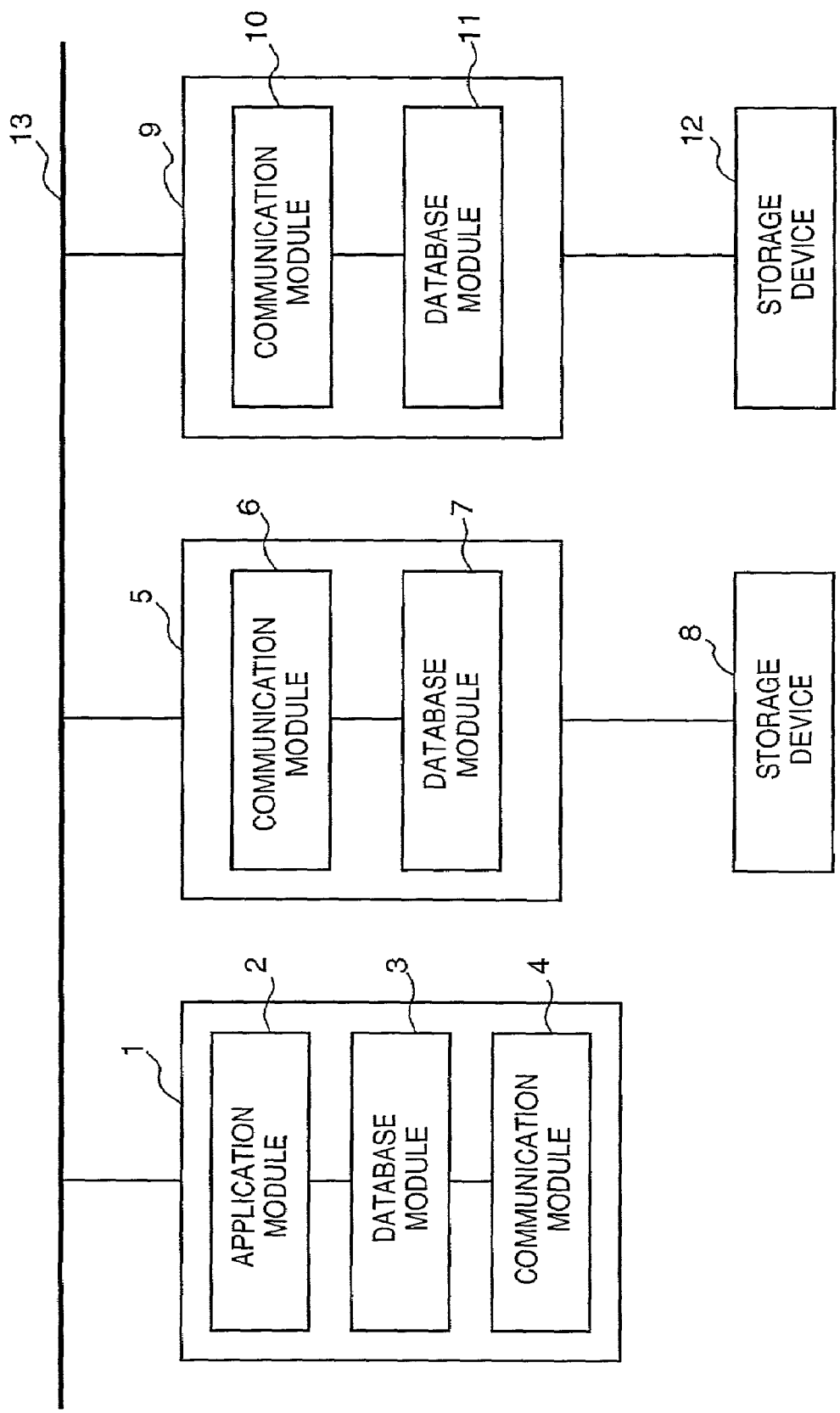
FIG. 2 is a block diagram showing the principal functional arrangement of the distributed database system of the first embodiment.

FIG. 2 is a block diagram showing the principal functional arrangement of the distributed document database system according to the first embodiment. The database client 1 has installed an application module 2, database module 3, and communication module 4. The functions of these modules are implemented when the CPU 101 executes control programs stored in the ROM 102 or loaded onto the RAM 103.

The database servers 5 and 9 have respectively installed communication modules 6 and 10, and database modules 7 and 11. The storage devices 8 and 12 save document data, and comprise hard disks and the like. In the database servers 5 and 9, different document databases are registered. The functions of the modules associated with the database servers 5 and 9 are implemented when the CPUs 121 and 131 execute control programs stored in the ROMs 122 and 132 or RAMs 123 and 133.

The operator starts the application module 2 on the database client 1 to search, edit, and print documents in the document databases. For example, when the operator instructs the application module 2 to search the document database registered in the database server 5 for a document, the application module 2 starts a document search function of the database module 3. The document search function of the database module 3 sends a document search command to the database server 5 via the communication module 4. Upon reception of the document search command, the communication module 6 of the database server 5 sends it to the database module 7.

The database module 7 searches document data saved in the storage device 8, and sends a search result to the client 1 via the communication module 6. The communication module 4 of the client 1 passes the received search result to the database module 3. Furthermore, the database module 3 sends the passed search result to the application module 2. The application module 2 displays the search result on the display 106 or the like.

When the operator instructs the application module 2 to copy a document between the document databases, the database module 3 reads out document information from the source document database, checks document attributes that can be set in these document databases, and copies the document to the destination document database.

Figure 3:
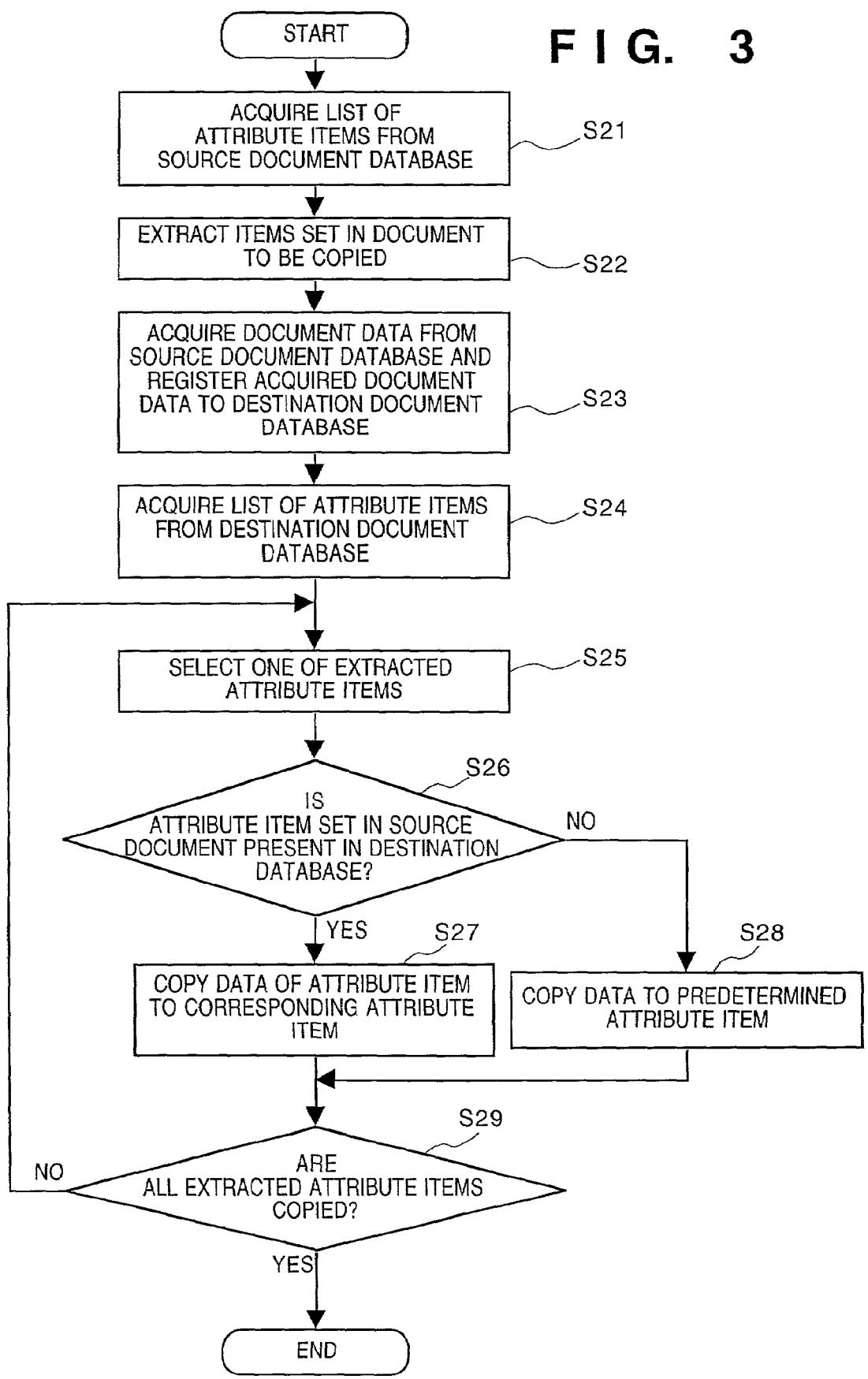
FIG. 3 is a flow chart showing the sequence of document copy processing between document databases done by a database module 3.

FIG. 3 is a flow chart showing the sequence of the document copy processing between the document databases done by the database module 3.

In step S21, the database module 3 acquires a list of attribute items associated with a document attribute from the source document database. In step S22, the database module 3 extracts attribute items set in the document to be copied. In step S23, the database module 3 acquires document data to be copied from the source document database, and registers it in the destination document database. Note that document data is image data in case of, e.g., an image document, or is binary data in case of a binary document.

In step S24, the database module 3 acquires a list of attribute items associated with a document attribute from the destination document database. The database module 3 selects, in step S25, one of the attribute items extracted in step S22, and checks in step S26 if the selected attribute item is present in the destination document database. If the selected item is present in the destination document database, the flow advances to step S27, and the database module 3 copies data in the selected attribute item to the corresponding attribute item of the copy destination.

On the other hand, if it is determined in step S26 that the selected attribute item is not present in the destination document database, the flow advances to step S28, and the database module 3 copies data to a predetermined attribute item of the copy destination. The database module 3 checks in step S29 if all the attribute items extracted in step S22 have been copied to document attribute information of the destination database. If some attribute items remain uncopied, the flow returns to step S25 to repeat the above-mentioned processing. If it is determined in step S29 that data for all the attribute items have been copied, this processing ends.

With the above-mentioned processing, it is checked if the destination database has the same attribute item for each of attribute items of the document attribute set for the source document. If the destination database has the same attribute item, data of that attribute item is copied to the corresponding attribute item of the destination document database. On the other hand, if the destination database does not have the same attribute item, the data of that attribute item is copied to a predetermined attribute item.

The aforementioned control will be described in more detail below with reference to FIGS. 4 and 5.

FIG. 4 shows an example of a document attribute. This document is saved in a document database named "patent publication database" that saves patent publications. In the patent publication database, the patent name, publication number, publication date, applicant, comment, and importance can be set as attribute items of the document attribute. The document shown in FIG. 4 sets the patent name "document database", publication number "1234567", publication date "Jan. 1, 1997", and comment "review required". The attribute items of applicant and importance are not set.

FIG. 5 shows an example of a document attribute upon copying the document shown in FIG. 4 to another document database named "report database". In the report database, the document name, document number, creator, and comment can be set as a document attribute. It is determined that when a document of another document database is copied to this document database, if a certain attribute item of the source document is not present in this document database, data of such attribute item is registered in the attribute item "comment".

When the document data having the document attribute shown in FIG. 4 is copied to the report database, the contents of the comment of the source document are copied to the attribute item "comment", and attribute items which are not present in the report database but are set for the document to be copied, i.e., the patent name, publication number, and publication date are copied to the attribute item "comment". In this case, in order to indicate that these attribute items are copies of another database, these data are written in the format "[attribute item name]: contents". As a result, as shown in FIG. 5, "[patent name]: document database, [publication number]: 1234567, [publication date]: Jan. 1, 1997" are set as the attribute item "comment".

In the sequence shown in FIG. 3, the order of data written as a comment is not specified. For example, when an attribute item or items present in both the source and destination databases is or are selected first in step S25, the operator can easily confirm the document attribute. FIG. 5 shows the state wherein the document attribute data are copied in such selection order. That is, as the comment, the same attribute item data "review required" in the copy source is copied first, and then, attribute item data which do not match those in the copy destination are copied in turn.

As described above, according to the first embodiment, when the document attribute of the source document cannot be set in the destination database, since the original attribute name and data are registered as a comment, the document attribute of a new document can be easily input with reference to the document attribute of the original document by checking the contents of the comment. Even when the original document is deleted after copying, the document attribute data set in the original document can be basically prevented from being lost.

Since the destination database displays the document attribute of the copied document data, the document attribute information set in the copy source can be easily recognized (by looking up the attribute item "comment").

To restate, according to the first embodiment, the document attribute set in the source document database can be detected without any loss by checking the document attribute of the copied document in the destination document database. Hence, not only the document attribute after copying can be easily set but also information can be prevented from being lost even when the original document is deleted after copying.

Furthermore, a document can be copied without worrying about loss of information even when the document databases have different document attributes. More specifically, a system constructed by document databases with different document attributes can be built without worrying about loss of document information upon copying.

Second Embodiment

In the first embodiment described above, a predetermined document attribute (e.g., "comment") is checked upon copying a document between the document databases, and when it is determined that data set in that document attribute is attribute data which was set in another document attribute previously, and that document attribute can be set in the destination database, the attribute data can be set and copied as a document attribute.

For example, when the document shown in FIG. 5 is copied to the patent publication database shown in FIG. 4, comment data is checked. When a character string in "[ ]:" is found, it is determined that such character string is data which was set in another document attribute previously, and the character string that follows: can be copied as an attribute item in [ ]. This processing can be achieved by inserting processing shown in the flow chart in, e.g., FIG. 6 between steps S24 and 25 in FIG. 3.

Figure 6:
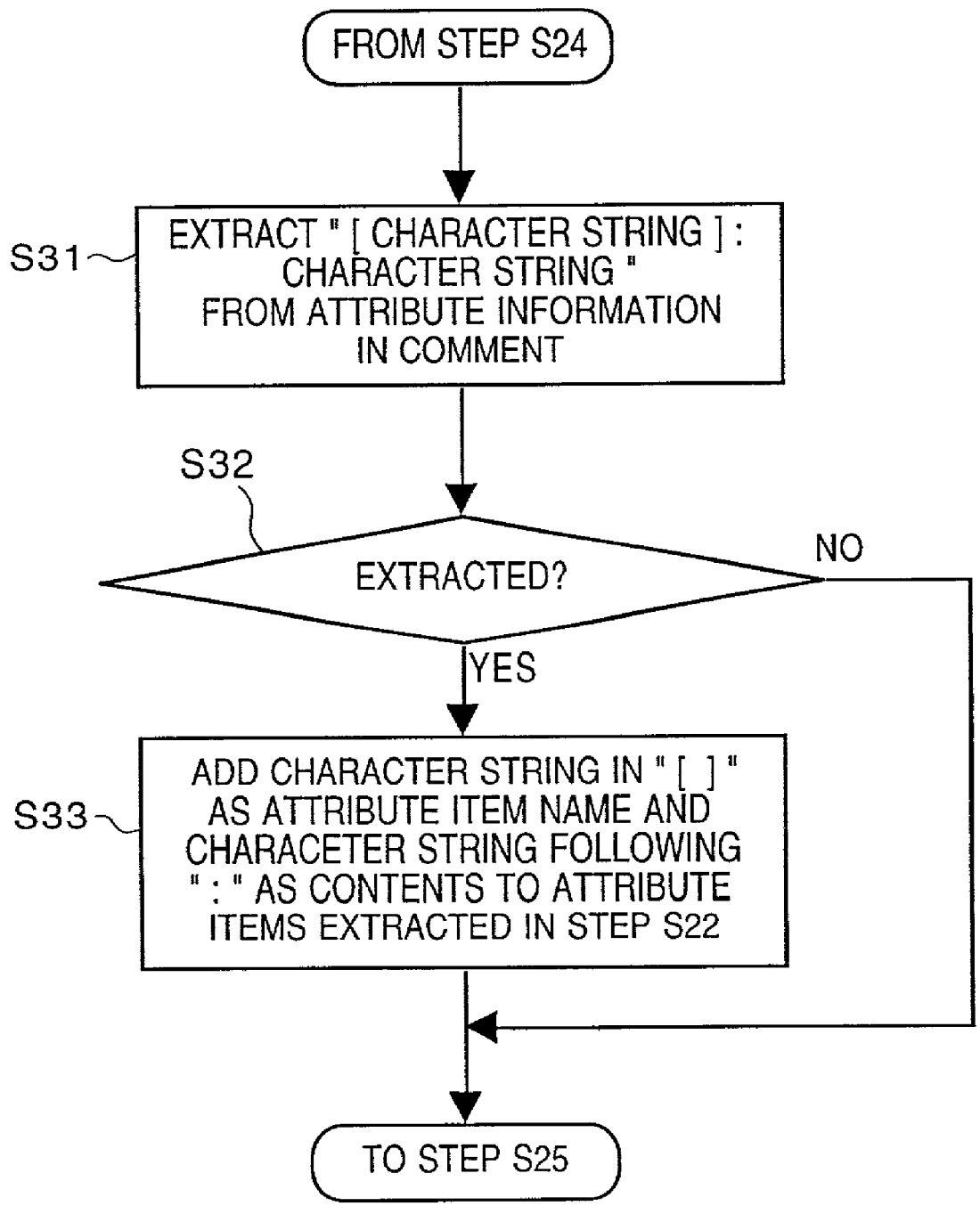
FIG. 6 is a flow chart showing additional processing according to the second embodiment of the present invention.

FIG. 6 is a flow chart showing the additional processing according to the second embodiment of the present invention. In step S31, the database module 3 extracts data described in the format "[first character string]: second character string" from the comment data. If no data is extracted, the flow jumps from step S32 to step S25. If data is extracted, the flow advances from step S32 to step S33. In step S33, the first and second character strings are added as the attribute item name and its contents to one of attribute items extracted in step S22. The flow then advances to step S25. As a result, in the copy processing of attribute item data executed in steps S25 to S29, if the same attribute item is found in the destination database, the attribute items copied as the contents of the comment can be recovered.

For example, when the document in the patent publication database shown in FIG. 4 is copied to the report database, the copied document has the document attribute shown in FIG. 5. When that copied document is copied to the patent publication database again, a document (FIG. 4) having the same document attribute as the document attribute data of the original document is registered.

As described above, according to the second embodiment, information set in a predetermined attribute item is checked to recover the document attribute. For this reason, when data is copied to a document database with a different document attribute and is copied again to the source document database, the original document attribute can be recovered, resulting in convenience. For example, when a document is copied to another document database and is copied again to the source document database, the document attribute need not be re-input, thus greatly improving operability.

Third Embodiment

When a common backup document database is prepared to back up data in a distributed document database system including a plurality of document databases, the backup document database can be very easily managed using the method described in the first and second embodiments.

According to the first embodiment, when a document is copied between the document databases, if an attribute item of the document attribute is not present in the destination document database, data of that attribute item is copied to a predetermined attribute item. Also, according to the second embodiment, when data set in a predetermined attribute item has a predetermined format, it is determined that the data was registered in a database with another document attribute previously, and when that attribute item can be set in the destination document database, the data is copied to the corresponding attribute item.

As described above, even when a plurality of document databases have different document attributes that can be set, the copied document data is copied to the original document database, its document attribute can be recovered. Hence, documents of all the different document databases can be copied to one backup document database. Even when the document attribute of the document database is changed, that of the backup document database need not be changed, thus allowing easy maintenance and management of a backup system.

For example, according to the third embodiment, after documents in a patent publication document database are copied to a common backup document database, when a new patent publication document database is built based on the contents of the backup document database, even when the common document database has no document attribute unique to the patent publication document database, such document attribute can be recovered. For this reason, even when a plurality of document databases having different document attributes are used, since a common backup database can be used, the system is easy to operate. Even when the document attribute of a given document database is changed, that of the backup document database need not be changed.

To recapitulate, according to the first to third embodiments, in the distributed document database system including a plurality of document databases, even when document attributes that can be set are different in units of document databases, data can be prevented from being lost upon copying a document between the document databases, thus greatly increasing the degree of freedom in system. Since a document attribute unique to each document database can be set, the document database is easy to use. Furthermore, when a document is copied between the document databases having different document attributes, the document attribute set in the original document is not deleted but is reflected in the document attribute of the copied document. Hence, the need for registering a new document attribute can be obviated, and operator errors can be avoided, thus improving reliability. Moreover, after a document is copied to another document database, and is then copied to the original document database, the document attribute of the original document can be recovered. Hence, the document attribute need not be re-input. In addition, one document database can be used as a backup for a plurality of document databases.

Fourth Embodiment

In the first embodiment, data of all attribute items which do not match those in the destination are registered in a single attribute item (comment) in a predetermined format. By contrast, in the fourth embodiment, such attribute items are converted, so that attribute information can be recorded in corresponding attribute items.

Since the arrangements of a distributed document database system, database client, and database servers according to the fourth embodiment are the same as those in the first embodiment (FIGS. 1 and 2), a detailed description thereof will be omitted.

In the fourth embodiment, when the operator instructs the application module to copy a document between the document databases, the database module reads out document data from the source document database, and copies it to the destination database. At this time, the database module copies the document data to the destination document database by checking document attribute conversion information between the copy source and destination, and matching the document attribute information of the copy source to that of the copy destination.

In the fourth embodiment, an explanation will be also given using the example of the document attribute shown in FIG. 4. FIG. 7 shows an example of document attribute conversion information in the fourth embodiment. This information is a text file, which is saved under a predetermined directory of the database client. The first line describes a word ([Database]) representing the document database. The second line describes "From=" followed by the document database name serving as the copy source. The third line describes "To=" followed by the document database name of the copy destination. The fourth line describes a word ([Property]) that represents the document attribute. In the fifth line and subsequent lines, document attribute items of the conversion destination and those of the conversion source are registered on the left and right sides, respectively, of the equality sign "=". For example, "document name=patent name" in the fifth line indicates that attribute item data with document attribute "document name" in "patent publication database" is set in an attribute item "document name" of the document attribute of "report database". Likewise, the sixth line represents that "publication number" is set in "document number", the seventh line represents that "applicant" is set in "creator", the eighth line represents that "importance" is set in "comment", and the ninth line represents that "comment" is set in "comment".

Figure 8:
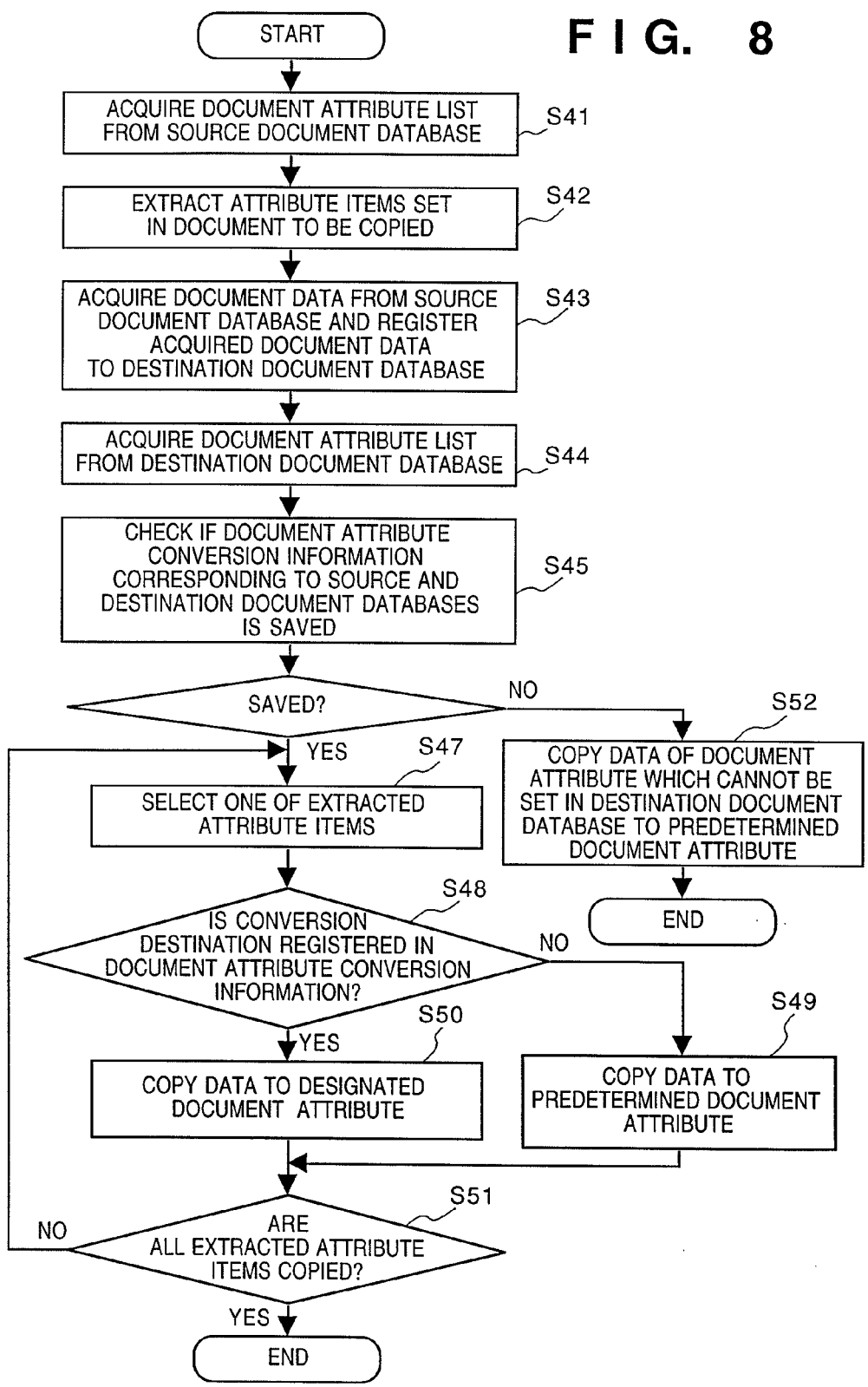
FIG. 8 is a flow chart for explaining the operation of a database module of a database client in the fourth embodiment.

FIG. 8 is a flow chart for explaining the operation of the database module of the database client according to the fourth embodiment. The database module acquires a document attribute list from the source document database in step S41, and extracts attribute items which are set in the document to be copied in step S42. In step S43, the database module acquires document data from the source database, and registers it in the destination database. In step S44, the database module acquires a document attribute list from the destination document database. In step S45, the database module checks if document attribute conversion information corresponding to the source and destination document databases is saved.

If the document attribute conversion information is not saved, the flow advances to step S52. In step S52, the database module copies attribute information of each attribute item which can be set in the destination document database to the corresponding attribute item, and copies data of an attribute item which cannot be set in the destination document database to a predetermined attribute item of the document attribute, thus ending the processing. That is, the processing in step S52 is the same as that in steps S25 to S29 described in the first embodiment.

On the other hand, if the document attribute conversion information is saved, the processing in steps S47 to S51 is executed. That is, information of an attribute item, the conversion destination of which is set, is copied to the destination attribute item according to that setup, and information of an attribute item, the conversion destination of which is not set, is copied to a predetermined attribute item. This processing steps will be described in turn below.

In step S47, the database module selects one of the attribute items extracted in step S42, and the flow advances to step S48. The database module checks in step S48 if the conversion destination of the selected attribute item is registered in the document attribute conversion information. If the conversion destination is not registered, the flow advances to step S49, and the database module copies data to a predetermined attribute item. On the other hand, if the conversion destination is registered in the document attribute conversion information, the database module copies data to an attribute item designated as the conversion destination. The database module checks in step S51 if the processing in steps S47 to S50 is complete for all the attribute items extracted in step S42. If items to be processed still remain, the flow returns to step S47 to select the next attribute item. On the other hand, if the processing is complete for all the attribute items, this processing ends.

FIG. 9 shows document attribute information when the document shown in FIG. 4 is copied to the report database according to the document attribute conversion information shown in FIG. 7. The document attribute is converted in accordance with the document attribute conversion information shown in FIG. 7. As a result, data of "patent name" in the source document is copied to "document name", "publication number" to "document number", and "publication date" to "comment". In the report database, a document attribute item, the conversion destination of which is not designated, is copied to the comment.

In the fourth embodiment, since the document attribute is converted in accordance with the document attribute conversion information, the operator need not set any document attribute after the document is copied, and operator errors can be prevented, thus improving reliability. Once the document attribute conversion information is saved, the document attribute is appropriately copied upon copying arbitrary documents between the document databases, resulting in convenience.

Fifth Embodiment

In the fourth embodiment, upon copying document data between the document databases, when no document attribute conversion information is set between the source and destination document databases, information of an attribute item that cannot be set in the destination document database is copied to an attribute item designated in advance in the destination database.

By contrast, the fifth embodiment has a function of creating document attribute conversion information. When no document attribute conversion information corresponding to the source and destination document databases is registered upon copying a document between the document databases, the document attribute conversion information creation processing is started. That is, in the processing in step S52 in FIG. 8 above, the document attribute conversion information creation processing is started.

Figure 10:
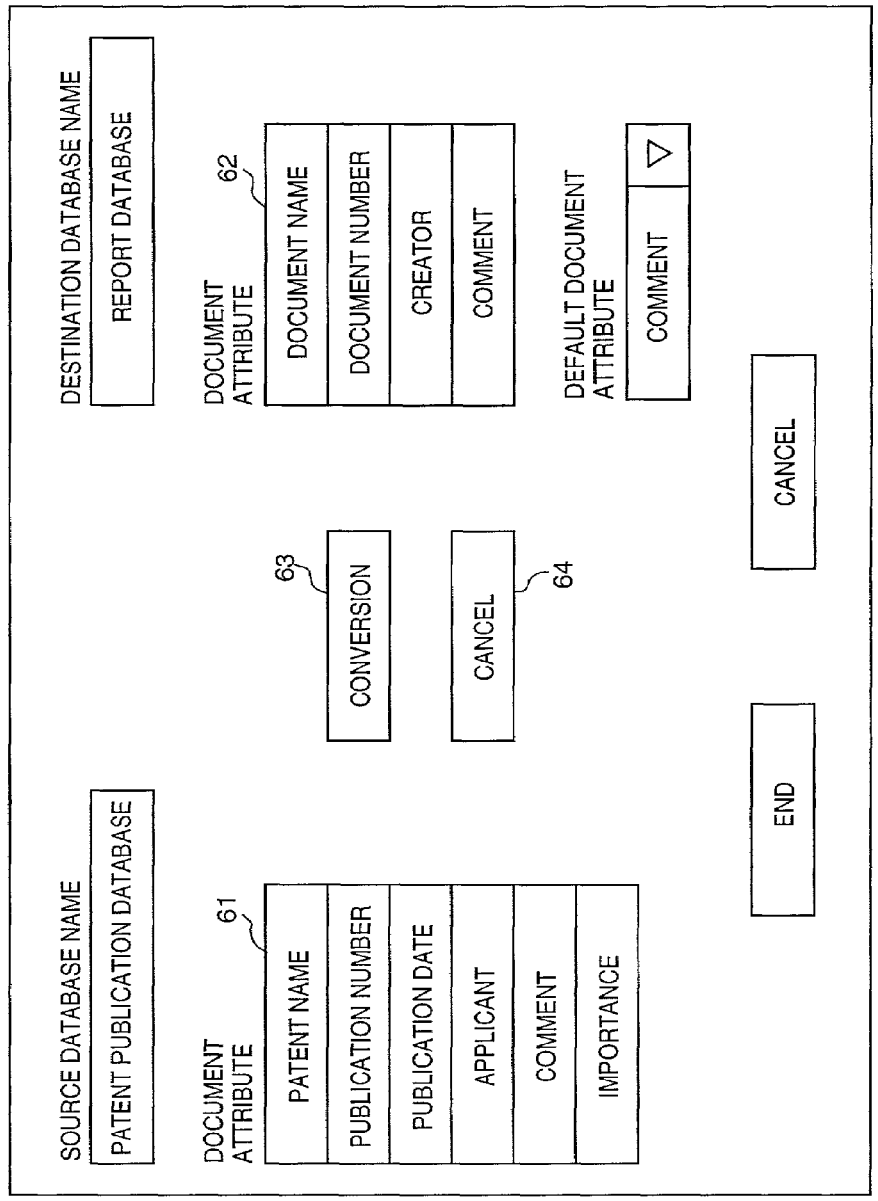
FIG. 10 shows an example of a dialog displayed in a process for creating document attribute information.

FIG. 10 shows an example of a dialog displayed in the document attribute conversion information creation processing. This dialog displays a document attribute list 61 of the copy source acquired in step S41, and a document attribute list 62 of the copy destination acquired in step S44. The operator selects one attribute item from the document attribute list 61 of the copy source, and designates an attribute item of the conversion destination from the document attribute list 62 of the destination database. Then, the operator clicks a conversion button 63 to determine the correspondence between the source and destination attribute items. For example, when the operator selects "patent name" in the list 61 and "document name" in the list 62 and then clicks the conversion button 63, the conversion information up to the fifth line in FIG. 7 is generated. Note that a cancel button 64 is used for canceling the determined correspondence. For example, when the operator selects "patent name" in the list 61 and "document name" in the list 62 and then clicks the release button 64, the fifth line in FIG. 7 is deleted.

When the dialog is closed after the conversion destinations for the document attribute of the copy source are determined in this way, the same text file as that in FIG. 3 is created, and is saved under a predetermined directory. The flow then advances to step S47, and the document attribute copy processing in step S47 to S51 is executed.

In the fifth embodiment, when no document attribute conversion information corresponding to the source and destination databases is registered, since the document attribute conversion information creation processing is automatically started, the document attribute conversion information can be easily created and registered.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

To recapitulate, according to the present invention, upon copying data between databases that are appended with different kinds of attribute information, the destination database can hold the attribute information of the source data.

Also, according to the present invention, attribute information set for the document in the source database can be easily detected by checking the document attribute in the destination database.

Furthermore, according to the present invention, when given data is copied to a database with a different kind of attribute information, and is then copied to the source database, the original attribute information can be automatically recovered.

Moreover, according to the present invention, a backup database which is common to a plurality of databases with different kinds of attribute information and can prevent loss of attribute information upon copying data between the databases can be easily built.

In addition, according to the present invention, since a document attribute can be converted and copied in accordance with conversion information for converting a document attribute upon copying a document between the document databases, the document attribute can be appropriately copied without any intervention of the operator, thus preventing operator errors.

Also, according to the present invention, when no conversion information corresponding to the source and destination databases is registered, since the conversion information generation processing is started, the conversion information can be easily created and registered.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus which can access a plurality of databases, comprising:

first copying means for copying data selected from a first database to a second database;

determination means for determining if each of attribute items of attribute information appended to the copied data corresponds to each of attribute items of the second database; and second copying means for copying content data of an attribute item as content data of a corresponding attribute item of the second database if it is determined by said determination means that the attribute item corresponds to one of the attribute items of the second database, and for copying content data of an attribute item and item information indicating the attribute item as content data of a predetermined attribute item of the second database in a predetermined format if it is determined by said determination means that the attribute item does not correspond to any of the attribute items of the second database, wherein said predetermined format indicates information of a mismatching attribute item.

2. The apparatus according to claim 1, wherein the predetermined format indicates an attribute item name and content.

3. The apparatus according to claim 2, further comprising information recovery means for, when content data stored in the predetermined attribute item in the predetermined format is detected, recovering the detected content data on the basis of the attribute item name and content indicated by the information.

4. The apparatus according to claim 1, further comprising:

holding means for holding conversion information indicating a correspondence between attribute items of the first and second databases, and wherein said determination means determines based on the conversion information if each of the attribute items of the attribute information appended to the data corresponds to each of the attribute items of the second database.

5. An information processing method which can access a plurality of databases, comprising the steps of:
copying data in a first copying step selected from a first database to a second database;
determining in a determination step if each of attribute items of attribute information appended to the copied data corresponds to each of the attribute items of the second database; and
copying in a second copying step data of an attribute item as content data of a corresponding attribute item of the second database if it is determined by said determination means that the attribute item corresponds to one of the attribute items of the second database, and copying content data of an attribute item and item information indicating the attribute item as content data of a predetermined attribute item of the second database in a predetermined format if it is determined by said determination means that the attribute item does not correspond to any of the attribute items of the second database, wherein said predetermined format indicates information of a mismatching attribute item.

6. The method according to claim 5, wherein the predetermined format indicates an attribute item name and content.

7. The method according to claim 6, further comprising the information recovery step of recovering the detected content data on the basis of the attribute item name and content thereof indicated by attribute information, when content data stored in the predetermined attribute item in the predetermined format is detected in the second copying step.

8. The method according to claim 5, further comprising the step of:
a holding step of holding conversion information indicating a correspondence between attribute items of the first and second databases,
wherein the determination step includes the step of determining based on the conversion information if each of the attribute items of the attribute information appended to the data corresponds to each of the attribute items of the second database.

9. A database system which can copy data between a plurality of databases, comprising:
first copying means for copying data selected from a first database to a second database;
determination means for determining if each of attribute items of attribute information appended to the copied data corresponds to each of attribute items of the second database; and
second copying means for copying content data of an attribute item as content data of a corresponding attribute item of the second database if it is determined by said determination means that the attribute item corresponds to one of the attribute items of the second database, and copying content data of an attribute item and item information indicating the attribute item as content data of a predetermined attribute item of the second database in a predetermined format if it is determined by said determination means that the attribute item does not correspond to any of the attribute items of the second database, wherein said predetermined format indicates information of a mismatching attribute item.

10. A method of controlling a database system which can copy data between a plurality of databases, comprising the steps of:
copying data in a first copying step selected from a first database to a second database;
determining in a determination step if each of attribute items of attribute information appended to the data corresponds to each of attribute items of the second database; and
copying in a second copying step content data of an attribute item as content data of a corresponding attribute item of the second database if it is determined by said determination step that the attribute corresponds to one of the attribute items of the second database, and copying content data of an attribute item and item information indicating the attribute item as content data of a predetermined attribute item of the second database in a predetermined format if it is determined by said determination step that the attribute item does not correspond to any of the attribute items of the second database, wherein said predetermined format indicates information of a mismatching attribute item.

11. A computer-readable storage medium which stores a computer-executable control program for a database client which copies data between a plurality of databases, said control program comprising:
code for a first copying step of copying data selected from a first database to a second database;
code for a determination step of determining if each of attribute items of attribute information appended to the copied data corresponds to each of the attribute items of the second database; and
code for a second copying step of copying content data of an attribute item as content data of a corresponding attribute item of the second database if it is determined by said determination means that the attribute item corresponds to one of the attribute items of the second database, and copying content data of an attribute item and item information indicating the attribute item as content data of a predetermined attribute item of the second database in a predetermined format if it is determined by said determination means that the attribute item does not correspond to any of the attribute items of the second database, wherein said predetermined format indicates information of a mismatching attribute item.

* * * * *